(12) United States Patent
Rozzi et al.

(10) Patent No.: US 8,777,529 B2
(45) Date of Patent: Jul. 15, 2014

(54) MECHANISM FOR DELIVERING CRYOGENIC COOLANT TO A ROTATING TOOL

(75) Inventors: Jay Christopher Rozzi, Hanover, NH (US); John Kendall Sanders, Hartland, VT (US); Nathan W. Brown, Grafton, NH (US); Michael Phillip Day, Cornish, NH (US)

(73) Assignee: Creare Incorporated, Hanover, NH (US)

(*) Notice: Subject to any disclaimer, the term of this patent is extended or adjusted under 35 U.S.C. 154(b) by 943 days.

(21) Appl. No.: 12/905,450

(22) Filed: Oct. 15, 2010

(65) Prior Publication Data

US 2012/0093604 A1 Apr. 19, 2012

(51) Int. Cl.
B23C 5/28 (2006.01)
B23Q 11/10 (2006.01)
B23B 51/06 (2006.01)

(52) U.S. Cl.
CPC ............... B23Q 11/10 (2013.01); B23B 51/06 (2013.01); *B23B 2222/88* (2013.01); *B23B 2250/12* (2013.01); B23C 5/28 (2013.01); *B23Q 11/1023* (2013.01); *B23Q 11/1053* (2013.01)
USPC ................................ 409/136; 408/59; 279/20

(58) Field of Classification Search
USPC ............ 409/135–136; 408/56, 59, 57; 279/20
See application file for complete search history.

(56) References Cited

U.S. PATENT DOCUMENTS

| 3,024,030 | A | * | 3/1962 | Koch | 279/20 |
| 3,791,660 | A | * | 2/1974 | Bostley | 408/59 |
| 4,557,643 | A | * | 12/1985 | Cioci | 409/136 |
| 4,648,759 | A | * | 3/1987 | Ebenhoch | 409/136 |
| 7,634,957 | B2 | | 12/2009 | Ghosh et al. | |

FOREIGN PATENT DOCUMENTS

| DE | 3129403 C2 | * | 2/1983 |
| DE | 4445232 A1 | * | 6/1996 |
| DE | 102008020740 A1 | * | 10/2009 |
| JP | 60-039036 A | * | 2/1985 |
| WO | 9960079 A2 | | 11/1999 |
| WO | 2008014933 A1 | | 2/2008 |
| WO | 2008044115 A1 | | 4/2008 |

* cited by examiner

*Primary Examiner* — Erica E Cadugan
(74) *Attorney, Agent, or Firm* — Reising Ethington P.C.

(57) ABSTRACT

A rotary coolant adapter that is compatible with commercially available tool holders attaches to a rotary tool holder to supply coolant to a flow path in a rotary tool. The rotary coolant adapter has a stationary outer housing and a stationary supply tube for supplying coolant to an annular coolant manifold that surrounds a portion of the rotary tool holder. An internal radial feed tube supplies coolant from the annular coolant manifold to the flow path in the tool. Bearings support the stationary outer housing on the rotary coolant holder, and seals are located between the annular coolant manifold and the bearings to prevent coolant leakage from the annular manifold reaching the bearings.

11 Claims, 3 Drawing Sheets

MECHANISM FOR DELIVERING CRYOGENIC COOLANT TO A ROTATING TOOL

This invention was made with Government support under Contract Nos. N68335-06-C-0069 and FA8650-07-C-5311 awarded by the Navy and Air Force, respectively. The Government has certain rights in the invention.

BACKGROUND

Titanium and other advanced aerospace materials are notoriously expensive and difficult to machine. By more effectively cooling the tool-chip interface, machining speeds and tool life can be increased, resulting in lower machining costs and faster production times. To this end, a rotary coolant adapter for conveying cryogenic fluids to a tooling system is useful in many applications, including the high-speed machining of titanium alloys, the high-speed machining of ceramic matrix composites, and the high-speed machining of aluminum metal matrix composites. Conveying cryogenic fluids to a tooling system allows the environmentally friendly machining of conventional materials without the use of cutting fluids.

Some cryogenically cooled rotary coolant adapters encounter high parasitic heating from the roller bearings when the entire assembly is cooled to cryogenic temperatures. As a result, roller bearing lifetimes are limited and cryogenic flow rates are reduced. It would accordingly be desirable to design a rotary coolant adapter in which the bearing elements of the rotary coolant adapter were thermally isolated from the cryogenic coolant.

SUMMARY

A rotary coolant adapter is designed to attach to the end of a rotary spindle and has a shape and size that is compatible with commercially available tool holder systems. The adapter utilizes an external, radial-feed liquid nitrogen ($LN_2$) port that can be used with variety of CNC machining centers to deliver liquid nitrogen to the tool. The adapter does not interfere with the coupling of the tool holder to the end of the spindle and can be used with automatic tool changers. The rotary coolant adapter has been optimized for cryogenic delivery to a tool at speeds of up to 10,000 rpm and is designed to thermally isolate the heat producing mechanical elements of the holder such as the bearings from the cryogenic coolant.

BRIEF DESCRIPTION OF THE DRAWINGS

FIG. 3 is a sectional view taken along line 3-3 in FIG. 2 showing the fluid communication to and from the annular coolant manifold.

FIG. 5 is a sectional view of an alternate form of rotary coolant adapter.

DESCRIPTION OF THE PREFERRED EMBODIMENT

Figure 1:
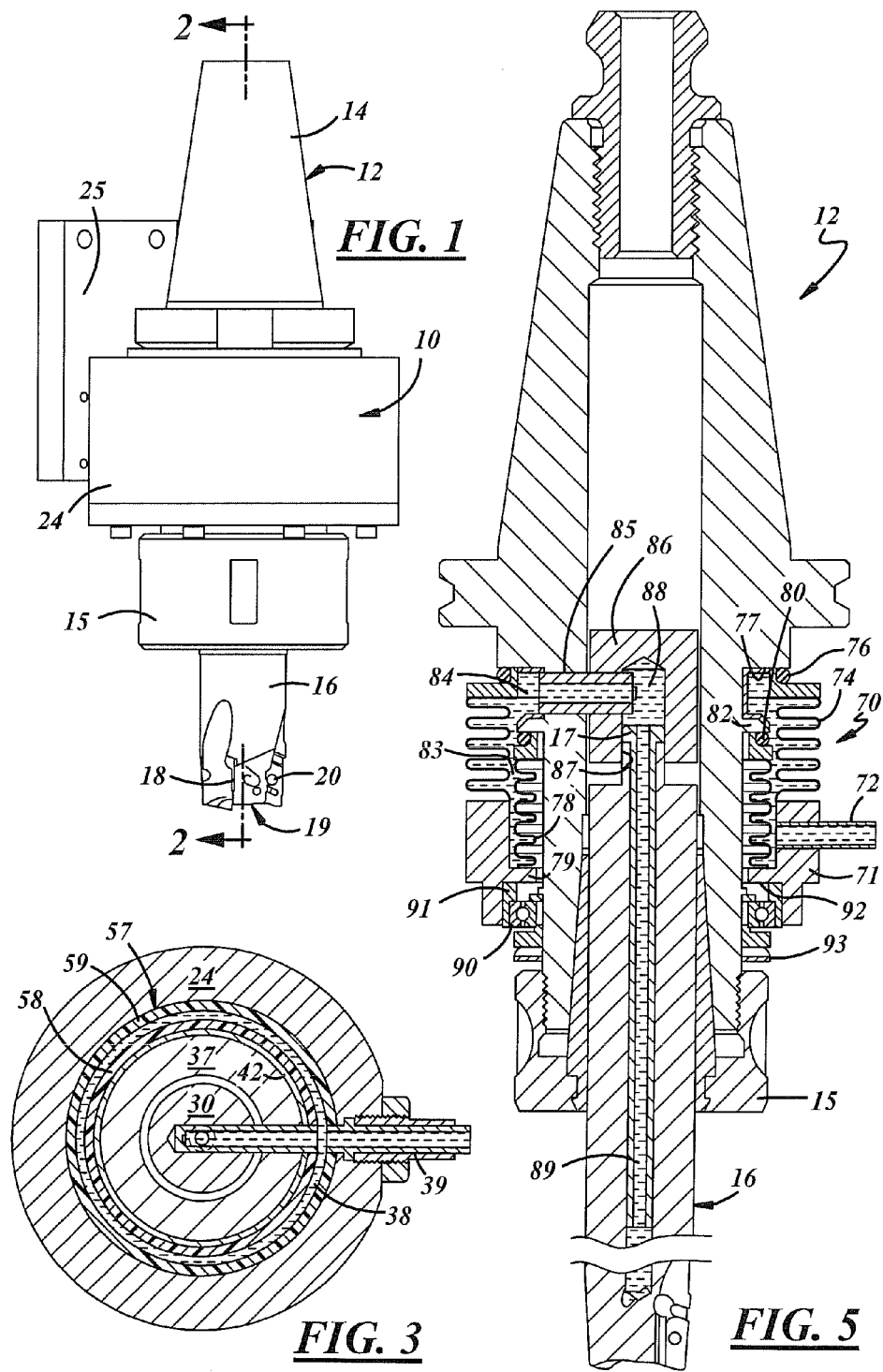
FIG. 1 is a front view of the rotary coolant adapter.

FIG. 1 shows a rotary coolant adapter generally designated by the reference numeral 10 that is attached to the end of a rotating tool holder 12. The rotating tool holder 12 is of a standard design and includes a tapered drive end 14 that couples to the end of a rotary spindle (not shown). A collet lock-nut 15 is mounted on the lower end of the rotating tool holder, and is used to secure a tool 16 in the holder in a manner that is well known in the art. A tool 16 such as a rotary end mill is mounted in the rotary tool holder. A plurality of cutting element inserts 18 are mounted in the working end 19 of the end mill as well known in the art. One or more outlets 20 may be provided in the working end of the tool to direct coolant onto the inserts 18 during a cutting operation as explained more fully below.

The rotary coolant adapter 10 surrounds a lower portion of the rotating tool holder 12. The rotary coolant adapter 10 comprises a stationary outer housing 24 and a mounting bracket 25. The mounting bracket 25 is used to attach the rotary coolant adapter 10 to the structure of a machine tool (not shown). An external coolant supply tube 27 (best seen in FIG. 2) is coupled to the stationary outer housing 24. The external coolant supply tube 27 receives cryogenic coolant from an outside source of supply (not shown) and delivers coolant to the rotating tool 16.

Figure 2:
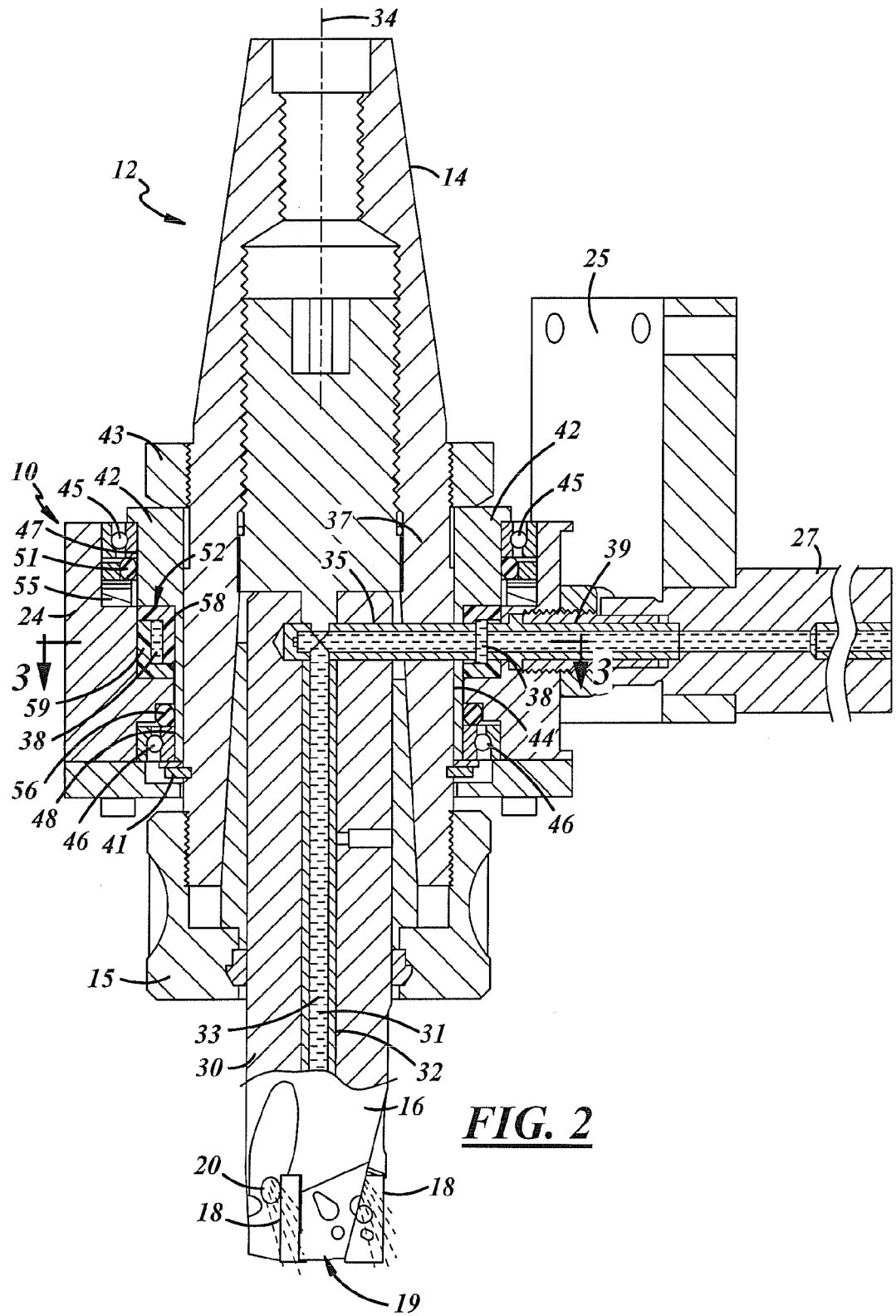
FIG. 2 is a sectional view of the rotary coolant adapter of FIG. 1.

FIG. 2 is a sectional view of the assembly of FIG. 1. The tool 16 has an elongated body 30 and an axial cryogenic fluid path 31 is provided along the rotary axis 34 of the tool. The axial fluid path 31 is lined with TEFLON (PTFE) or other insulating material 32 to prevent thermal transfer between the cryogen 33 in the fluid path and the body 30 of the tool. The axial fluid path 31 is coupled to the outlets 20 positioned in the working end of the tool that are designed to provide maximum cooling to the cutting element inserts 18. An integral radial feed tube 35 is located in the upper end of the tool and extends through the side wall 37 of the rotary tool holder. The integral radial feed tube 35 couples the axial fluid path 31 in the tool to an annular coolant manifold 38 located in the rotary coolant adapter 10. An internal manifold supply tube 39 is coupled to the annular manifold 38 and supplies cryogen from the external coolant supply tube 27 to the annular manifold 38.

A positioning ring 41 is mounted on the lower end of the tool holder 12 above the collet lock nut 15. An inner mounting sleeve 42 forms the inner wall of the rotary coolant adapter 10 and is dimensioned to fit over the outside surface 44 of the rotating tool holder 12. A retaining nut 43 is used to secure the inner mounting sleeve 42 between the retaining nut 43 and the positioning ring 41 on the tool holder.

An upper annular bearing 45 and a lower annular bearing 46 are used to mount the inner mounting sleeve 42 on the stationary housing 24 of the rotary coolant adapter so that the inner mounting sleeve 42 can rotate relative to stationary housing 24. The upper and lower annular bearings 45 and 46, respectively, are positioned along the axial length of the rotary tool holder and are spaced approximately equidistant from the annular manifold 38 so that the coolant in the annular manifold has equal thermal effect on the upper and lower bearings. The upper and lower bearings are mounted in bearing pockets 47 and 48, respectively, with exaggerated clearances to provide for expansion and contraction of the stationary housing 24 in response to the large temperature gradients that the bearings will be exposed to. An upper seal 51 is positioned below the upper bearing 45, and a wave spring 55 biases the upper seal 51 into engagement with the lower end surface of the upper bearing 45. The compliance of the wave spring 55 against the upper bearing 45 allows for thermal contraction of the rotating components caused by the cryogen coolant. A lower seal 56 is mounted in contact with the upper end surface of the lower bearing 46.

Turning now to FIG. 3, the annular coolant manifold 38 is formed between the inner mounting sleeve 42 and the stationary housing 24 of the rotary coolant adapter. The cryogenic coolant in the annular manifold 38 is thermally insulated from the surrounding structure by a manifold liner 57 formed from PTFE, or other suitable insulating material. The manifold liner 57 is formed by a rotating liner portion 58 which is in contact with the inner mounting sleeve 42, and a stationary liner portion 59 which is in contact with the stationary outer housing 24. The liner portions 58 and 59 fit together to form a hollow channel that forms the annular manifold 38. The annular manifold 38 receives cryogenic coolant from the internal manifold supply tube 39 and supplies cryogenic coolant to the integral feed tube 35 that is connected to the axial fluid path 31 in the tool. The cryogenic coolant may comprise liquid nitrogen, but other cryogenic coolants may be used.

The device as shown in FIGS. 1-3 uses fiber-reinforced polymer seals 51 and 56 to minimize the leakage of liquid nitrogen between the stationary and rotating portions of the housing. Such seals are manufactured and sold by Garlock Helicoflex. The polymer seals 51 and 56 are located between the annular manifold 38 and the upper and lower bearings 45 and 46, and shield the bearings from direct exposure to liquid cryogen that may leak from the annular manifold 38.

The design of FIGS. 1-3 provides clearance for the upper bearing 45 to move axially during thermal contraction of the housing, thus extending bearing life, and reducing heat load from the bearings. The two polymer seals 51 and 56 minimize cryogenic leakage between the annular manifold 38 and the upper and lower bearings 45 and 46. The coupling of the external coolant supply tube 27 to the internal manifold supply tube 39 provides a leak-tight radial connection to a stationary cryogen source.

In operation, cryogen is supplied by the external coolant supply tube 27 to the internal manifold supply tube 39 and to the annular coolant manifold 38. Coolant in the manifold 38 flows through the integral radial feed tube 35 to the axial fluid path 31 in the tool and is exhausted through the outlets 20 formed in the working end 19 of the tool. The cryogenic fluid remains substantially isolated from the stationary outer housing via the upper and lower fiber-reinforced polymer seals 51 and 56, respectively. The annular manifold 38 is located approximately midway between the bearings 45 and 46 to equalize the temperature load of the cryogen in the annular manifold 38 on the bearings. The annular manifold 38 supplies cryogen to the radial feed tube 35 located in the upper end of the rotating tool holder 12 and to the rotating tool 16. Coolant supplied to the upper end of the tool flows down the axial feed path 31 to the outlets 20 in the lower end of the tool. Coolant expelled from the outlets 20 is directed onto the cutting inserts 18 mounted in the working end 19 of the tool.

Figure 4:
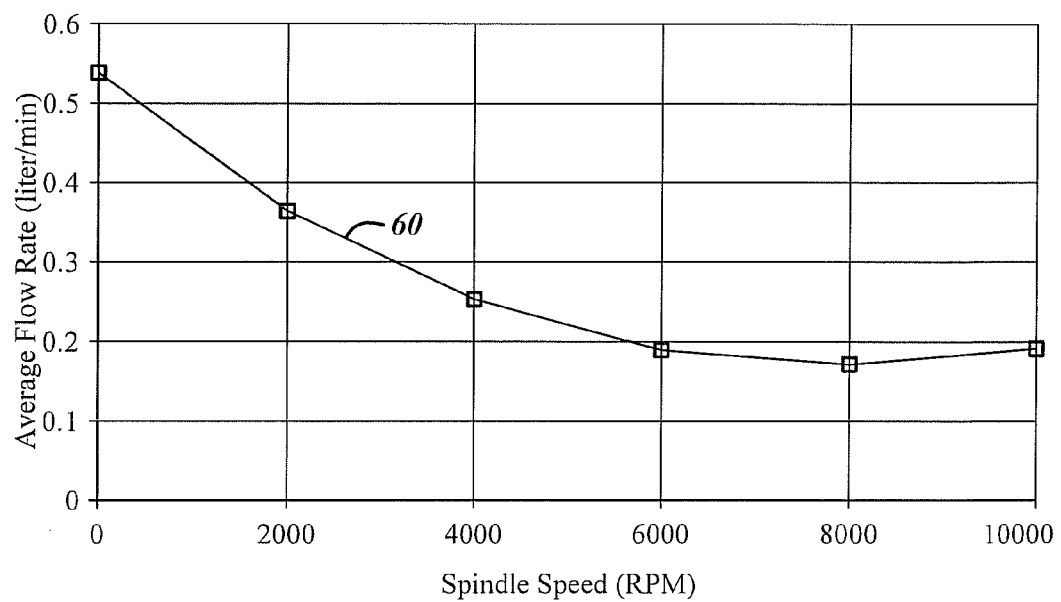
FIG. 4 is a graph showing the measured mass flow rate of coolant as a function of spindle speed.

FIG. 4 is a plot 60 of the overall average flow rate of cryogenic coolant vs. spindle speed for the cryogenically cooled tool of FIGS. 1-3. The plot 60 shows that as the spindle speed increases from zero revolutions per minute (RPM) to 8,000 RPM, the average flow rate of cryogenic coolant decreases from approximately 0.54 liters per minute to approximately 0.18 liters per minute. As the spindle speed increases from 8,000 RPM to 10,000 RPM, the average flow rate increases from approximately 0.18 liters per minute to approximately 0.19 liters per minute. The plot 60 is the result of measurements taken using a 1-inch diameter 3-fluted endmill having a coolant supply and three coolant outlets 20 at the working end of the endmill as shown in FIGS. 1-3.

An alternate embodiment of the device is shown in FIG. 5 which is designed for a type of spindle that is classified as a CAT-50 machine spindle. The embodiment uses two bellows elements 74 and 78 to provide both the cylinder wall for the liquid nitrogen manifold and the spring force for biasing the upper and lower seals against a seating surface. Those skilled in the art will appreciate that the annular manifold for the cryogenic liquid could be formed with a single outer bellows rather than an outer and an inner bellows. A rotating tool holder 12 is provided to hold an elongated tool 16. A collet nut 15 secures the tool 16 in the tool holder 12. A rotary coolant adapter 70 is mounted on the tool holder 12. The rotary coolant adapter 70 comprises a cylindrical body 71 in which is mounted a radial supply tube 72. An outer bellows element 74 extends from the top of the cylindrical body 71 to an upper seal 76 that is in contact with an upper shoulder 77 formed on the upper portion of the tool holder 12. An inner bellows element 78 extends from a ring 79 formed on the cylindrical body 71 to a lower seal 80 that abuts a lower shoulder 82 formed on the rotating tool holder 12. The space between the outer bellows element 74 and the inner bellows element 78 forms a coolant chamber 83 that that supplies coolant to an annular coolant manifold 84. A radial feed tube 85 receives coolant from the annular coolant manifold 84 and supplies the coolant to an upper coolant reservoir 88 that is formed in a reservoir cap 86. The reservoir cap 86 has an open end 87 that is dimensioned to be a snug fit on the upper end 17 of the tool 16 so that the tool may be coupled to the reservoir by axially inserting the end of the tool into the opening in the bottom of the reservoir cap. Coolant from the radial feed tube 85 flows into the upper coolant reservoir 88 and from the upper coolant reservoir to the axial fluid path 89 in the tool 16.

In the design as shown in FIG. 5, the rotating elements are mounted on the stationary elements by a single annular bearing assembly 90. The bearing 90 is mounted in an insulated bearing housing 91 to prevent heat from the bearings from heating the cryogenic coolant in the coolant chamber 83. The bearing housing 91 is mounted in a bearing pocket 92 with clearances to allow for thermal expansion and contraction of the elements, and a wave spring 93 is used to bias the bearing 90 into the pocket 92. As shown, the radial supply tube 72, the inner and outer bellows 78 and 74, the upper and lower seals 76 and 80, and the insulated bearing housing 91 are all stationary, and do not rotate. The tool holder 12 and the tool 16, the collet nut 15, the wave spring 93 and the bearing 90 all rotate. In addition to providing the cylinder walls for the liquid cryogen manifold, the outer and inner bellows 74 and 78 respectively, provide the spring biasing force for the upper and lower seals 76 and 80, respectively, so that the seals remain in contact with their respective seating surfaces 77 and 82.

The embodiment shown in FIG. 5 provides the same benefits as the embodiment of FIGS. 1-3, yet permits tools such as the elongated tool 16 to be easily exchanged without disassembly of the internal components since the tool 16 can be axially withdrawn from the reservoir cap 86 and the tool holder 12 without disturbing the mounting of the radial feed tube 85 in the reservoir cap. Additionally, the number of rotating wear components is reduced to the upper and lower seals 76 and 80 and the single annular bearing 90, and these components can be easily replaced. Those skilled in the art can appreciate that the rotary coolant adapter described herein can be utilized in any commercially available spindle configuration.

Having thus described the invention, various modifications and alterations will occur to those skilled in the art, which modifications and alterations are intended to be within the scope of the invention as defined in the appended claims.

We claim:

1. A rotary coolant adapter system including a rotary coolant adapter designed to attach to a rotary tool holder, the rotary coolant adapter being for supplying coolant to a rotary tool having a flow path in the tool for coolant and having at least one outlet for the coolant in the cutting end of the tool, the at least one outlet being coupled to the flow path, the adapter system comprising:
   a stationary outer housing comprising a portion of the rotary coolant adapter;
   a supply tube for the coolant, coupled to the stationary outer housing;
   the rotary tool holder, configured for receiving the rotary tool, the rotary tool being rotatable about a rotational axis;
   an annular coolant manifold including at least one bellows element surrounding a portion of the rotary tool holder, the supply tube being coupled to the annular coolant manifold;
   the rotary tool holder including an internal radial feed tube supplying the coolant along a radial direction with respect to the rotational axis to the coolant flow path in the tool;
   whereby coolant may be supplied from a stationary external supply through the coolant supply tube to the annular coolant manifold and from the annular coolant manifold to the internal radial feed tube and from the internal radial feed tube to the flow path in the tool, and from the flow path to the at least one outlet in the cutting end of the tool.

2. The rotary tool adapter system of claim 1 further comprising at least one bearing supporting the rotary tool holder in the stationary outer housing.

3. The rotary coolant adapter system of claim 1 wherein the internal radial feed tube extends from the annular manifold through a wall of the rotating tool holder to the flow path in the tool.

4. The rotary coolant adapter system of claim 1 further comprising:
   a single bearing supporting the rotary tool holder in the stationary housing.

5. The rotary coolant adapter system of claim 4 wherein the at least one bellows element forms the annular coolant manifold, and wherein the internal radial feed tube receives coolant from the annular coolant manifold.

6. The rotary coolant adapter system of claim 5, wherein the at least one bellows element comprises a first bellows element, the rotary coolant adapter system further comprising:
   a first seal positioned between the first bellows element and the rotary tool holder, wherein the first bellows element provides a spring biasing force for biasing the first seal against the rotary tool holder.

7. The rotary coolant adapter system of claim 6, wherein the at least one bellows element further comprises a second bellows element, the rotary coolant adapter system further comprising:
   a second seal positioned between the rotating tool holder and the second bellows element, wherein the second bellows element provides a spring biasing force for biasing the second seal.

8. The rotary coolant adapter system of claim 7, wherein the first and second seals are spaced from one another in the axial direction.

9. The rotary coolant adapter system of claim 5 further comprising:
   a reservoir cap positioned in the rotary tool holder;
   a reservoir formed in the reservoir cap; and,
   an opening in an end of the reservoir cap for receiving an end of the rotary tool opposite the cutting end of the tool, the internal radial feed tube extending through the reservoir cap into the reservoir for delivering the coolant from the annular coolant manifold to the reservoir, whereby the tool may be coupled to the reservoir by axially inserting the end of the tool that is opposite the cutting end into the opening in the end of the reservoir cap.

10. The rotary coolant adapter system of claim 1 wherein the coolant is a cryogenic coolant.

11. A rotary coolant adapter system including a rotary coolant adapter designed to attach to a rotary tool holder, the rotary coolant adapter being for supplying coolant to a rotary tool having a cutting end, having a flow path in the tool for coolant, and having at least one outlet for the coolant in the cutting end of the tool, the at least one outlet being coupled to the flow path, the adapter system comprising:
   a stationary outer housing comprising a portion of the rotary coolant adapter;
   a supply tube for the coolant coupled to the stationary outer housing;
   the rotary tool holder, configured for receiving the rotary tool, the rotary tool being rotatable about a rotational axis;
   an annular coolant manifold surrounding a portion of the rotary tool holder, the supply tube being coupled to the annular coolant manifold;
   the rotary tool holder including an internal radial feed tube supplying the coolant along a radial direction with respect to the rotational axis to the coolant flow path in the tool;
   a single bearing supporting the rotary tool holder in the stationary housing;
   a radially inner bellows element and a radially outer bellows element, the inner and outer bellows elements forming the annular coolant manifold, the internal radial feed tube receiving coolant from the annular coolant manifold;
   a first seal positioned between the outer bellows element and the rotary tool holder, wherein the outer bellows element provides a spring biasing force for biasing the first seal against the rotary tool holder;
   a second seal positioned between the inner bellows element and the rotating tool holder, wherein the inner bellows element provides a spring biasing force for biasing the second seal;
   a reservoir cap positioned in the rotary tool holder;
   a reservoir formed in the reservoir cap; and,
   an opening in an end of the reservoir cap for receiving an end of the rotary tool that is opposite the cutting end of the rotary tool, the internal radial feed tube extending through the reservoir cap into the reservoir for delivering the coolant from the annular coolant manifold to the reservoir, wherein the tool may be coupled to the reservoir by axially inserting the end of the tool that is opposite the cutting end into the opening in the end of the reservoir cap.

* * * * *